Figure 1:
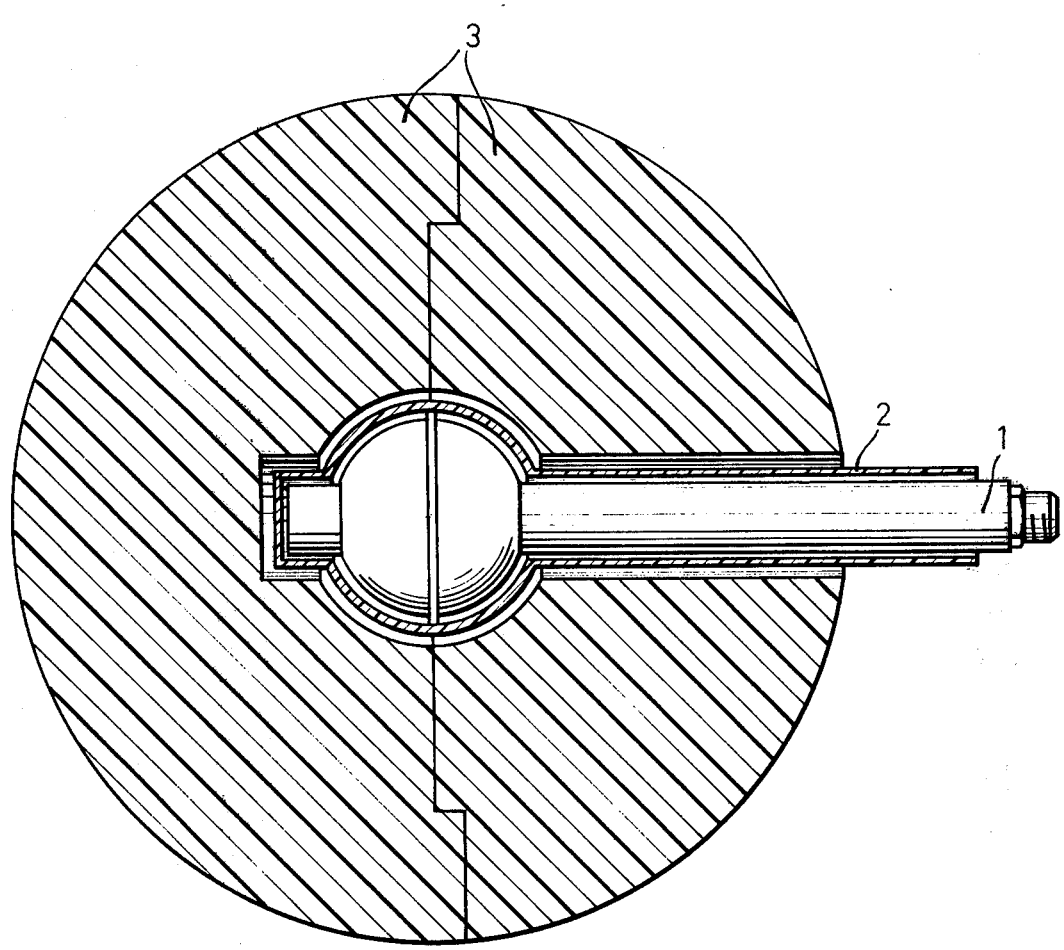

United States Patent [19]

Heinzelmann et al.

[11] 4,074,136
[45] Feb. 14, 1978

[54] APPARATUS FOR DETERMINING THE DOSE EQUIVALENT OF NEUTRONS

[75] Inventors: Max Heinzelmann; Fritz Rohloff; Hans Schüren, all of Julich, Germany

[73] Assignee: Kernforschungsanlage Julich Gesellschaft mit beschrankter Haftung, Julich, Germany

[21] Appl. No.: 766,773

[22] Filed: Feb. 8, 1977

Related U.S. Application Data

[63] Continuation-in-part of Ser. No. 617,397, Sept. 29, 1975, abandoned.

[30] Foreign Application Priority Data

Oct. 8, 1974 Germany .............................. 2447817

[51] Int. Cl.$^2$ ............................................ G01T 3/00
[52] U.S. Cl. .................................... 250/392; 250/390
[58] Field of Search ......................... 250/390, 391, 392

[56] References Cited

U.S. PATENT DOCUMENTS

| 3,141,092 | 7/1964 | Weinberg | 250/390 |
| 3,452,197 | 6/1969 | Saylor, Jr. et al. | 250/392 |
| 3,873,840 | 3/1975 | Ellis | 250/392 |

Primary Examiner—Archie R. Borchelt
Attorney, Agent, or Firm—Walter Becker

[57] ABSTRACT

An apparatus for determining the dose equivalent and dose rate equivalent of neutrons, which includes a detector for absorbing neutrons and emitting voltage pulses. The detector is surrounded by a mantle for moderating purposes and for absorbing neutrons. The detector is followed by amplifying means for amplifying the voltage pulses emitted by the detector while a voltage discriminator receives the amplified voltage pulses. The voltage discriminator is followed by recording means for registering the time average number of the voltage pulses emitted by the voltage discriminator while the detector for neutrons with energies up to at least $10^6$ eV emits voltage pulses, the height of which, depends both on the energy freed by the nuclear reaction initiated by the absorbed neutrons and on the kinetic energy of the absorbed neutrons. The number of these voltage pulses shows a maximum. The voltage discriminator has a bias level above the height of the voltage of the by far greatest number of the voltage pulses distributed about the last mentioned maximum.

5 Claims, 4 Drawing Figures

APPARATUS FOR DETERMINING THE DOSE EQUIVALENT OF NEUTRONS

This is a continuation-in-part of copending application Ser. No. 617,397 - Heinzelmann et al filed Sept. 29, 1975 and now abandoned.

The present invention relates to a device for determining the dose rate equivalent of neutrons, which device includes a detector which is operable to absorb neutrons and to emit voltage pulses while being provided with a mantle for moderating and absorbing neutrons. The device according to the present invention furthermore comprises an amplifying device which follows the detector, for amplifying the voltage pulses emitted by said detector. This amplifying device includes a voltage discriminator receiving the amplified voltage pulses and also includes a device which follows said voltage discriminator, for counting or measuring the time average number of the voltage pulses emitted by the voltage discriminator. The detector for neutrons with energies up to at least $10^6$ eV emits voltage pulses the height of which is dependent on the energy freed as a result of the nuclear process initiated in the detector by the absorbed neutrons, and is also dependent on the kinetic energy of the absorbed neutrons, while the number of the voltage pulses with a height within the region of the energy freed during the nuclear process shows a maximum.

Devices for determining the dose equivalent or the dose rate equivalent of neutrons are employed for measurements especially behind shields of neutron sources wherein general neutrons prevail with energies of from 1/40 eV up to about $10^7$ eV. The measurement aims as indicating a value for the damaging effect of neutrons upon a human body, which measurement, with reference to the respective equal flow of neutrons of different energy depends on the energy of the neutrons. This dependency is prescribed in dose equivalent curve suggested by the International Commission of Radiological Protection. Therefore, in order to realize the above mentioned goal, efforts are entertained to the effect that the response curve of the device, in other words, the counting rate per unit flow density as a function of the neutron energy in the above mentioned energy range will be in conformity as far as possible with the course of the dose equivalent curve. For purposes of protection against radiation, the energy independence of the devices for determining the dose equivalent or the dose rate equivalent is sufficient when the measured value of the device for no energy deviates by more than the factor 2 from the intended course.

Devices which are provided for determining the equivalent doses are known under the term "Rem-Counter". Devices are known which include a detector for neutrons, which detector is surrounded by a mantle of hydrogen-containing material such as paraffin, polyethylene, or the like. As detectors are employed, for instance $BF_3$- counting tubes or $^3$He-counting tubes which have a high sensitivity for thermal neutrons but have a low sensitivity for neutrons of high energy. These known devices have the drawback that the mantle has a wall thickness of at least 12.5 centimeters. Therefore, the heretofore known devices of the type involved are heavy and unwieldly.

In addition thereto, with the smallest ones of the known devices, an energy independent indication of the dose equivalent or the dose rate equivalent output for the neutron energies in the provided neutron energy region is realized only incompletely. It is known to improve the determination of the dose equivalent or the dose rate equivalent by carrying out the measurement by means of the detector repeatedly, in which instance, however, the detector is for each measurement surrounded by a mantle of different thickness. This heretofore known method is awkward and too expensive for practical requirements. There has furthermore become known a device which consists of a plurality of detectors arranged within one mantle. While with a device of this type a determination of the desired measurement is obtainable in a single measuring operation, the device is, however, rather complicated and expensive and is for practical requirements too heavy and unwieldly. Finally, there has become known a device in which the envelope of hydrogen-containing material has embedded therein a perforated absorbing layer while in this way a reduction in the wall thickness of the wall mantle is realized, this known device nevertheless still has a diameter of approximately 20 centimeters. Moreover, also with this device, the desired adaptation to the equivalent doses curve is not fully realized.

It is, therefore, an object of the present invention to provide a device of the general type set forth above which will permit a sufficiently precise determination of the dose equivalent or of the dose rate equivalent of neutrons of a neutron spectrum which corresponds to the spectrum behind the shield of the neutron sources, and which at the same time will be more handy than the heretofore known devices referred to above.

These objects and other objects and advantages of the invention will appear more clearly from the following specification, in connection with the accompanying drawings, in which:

FIG. 1 illustrates a detector with a mantle therefor.

Figure 2:
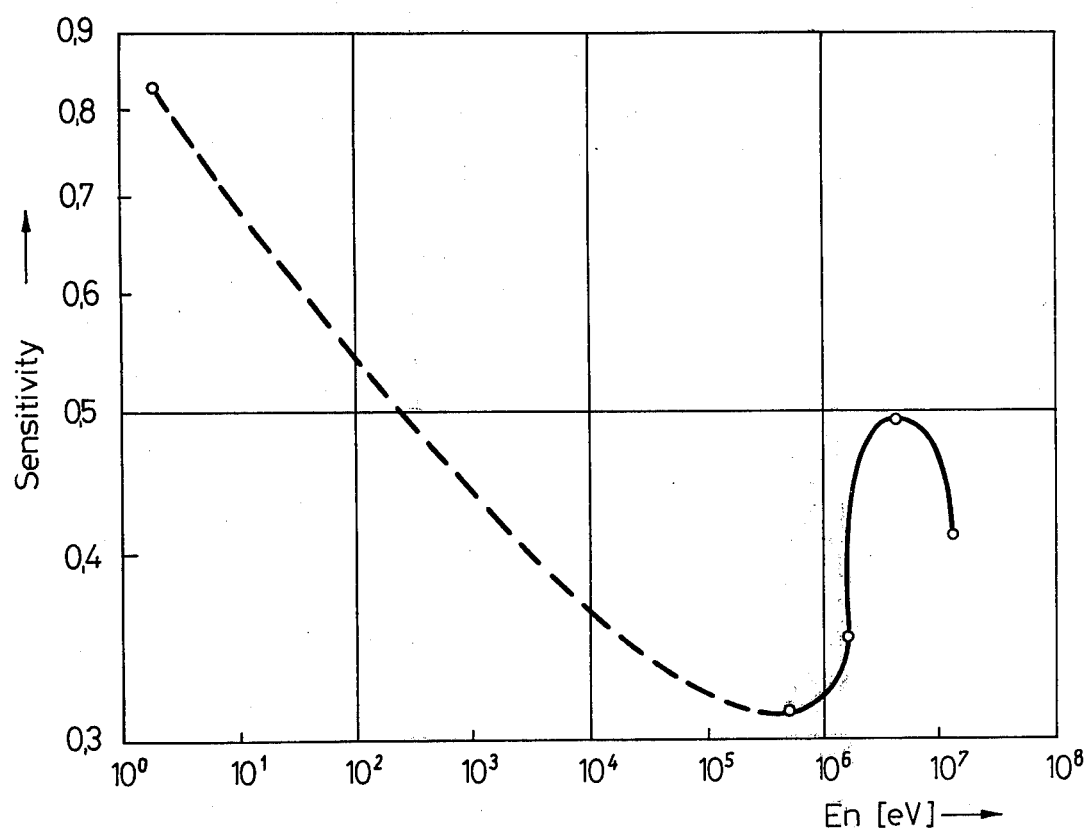
Figure 3:
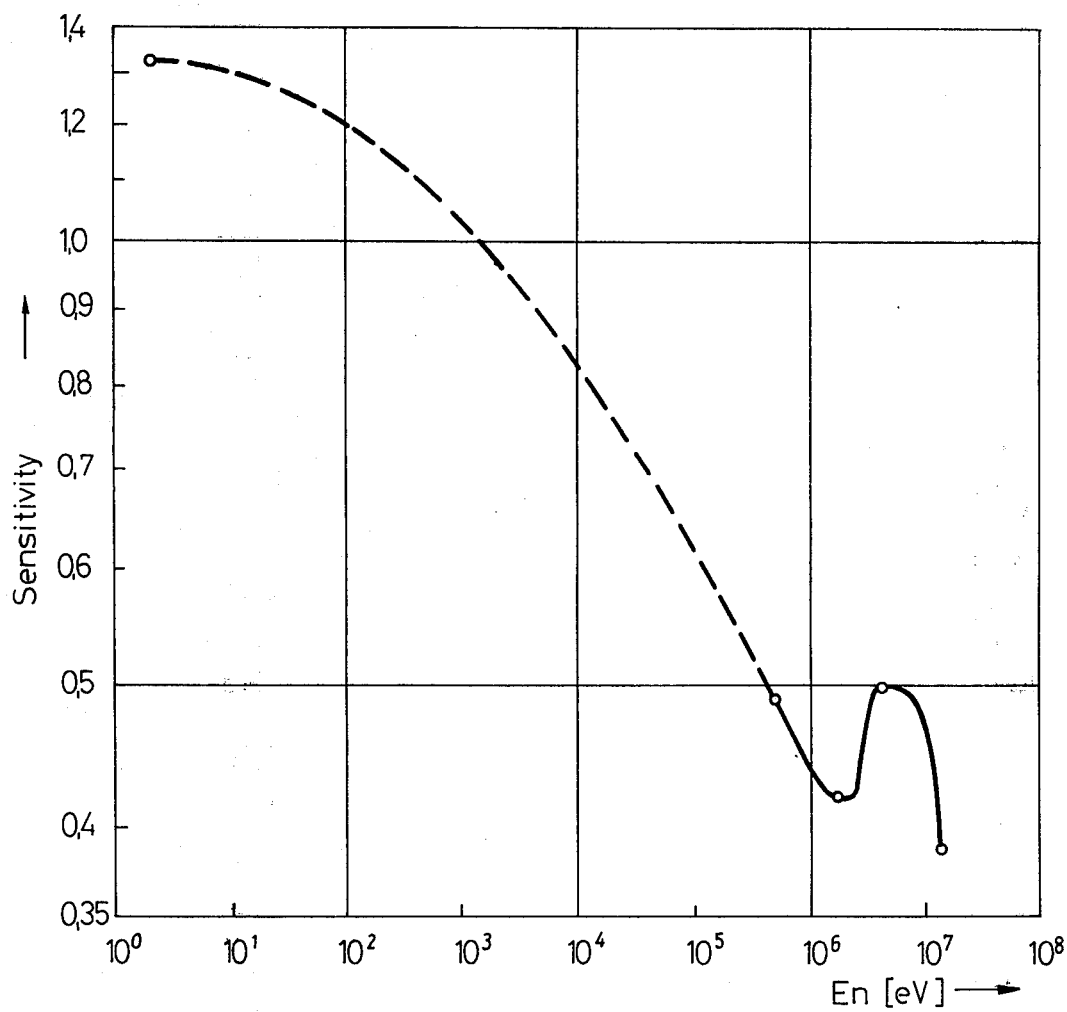

FIGS. 2 and 3 respectively show sensitive curves of two devices with detectors having a mantle of different thickness.

Figure 4:
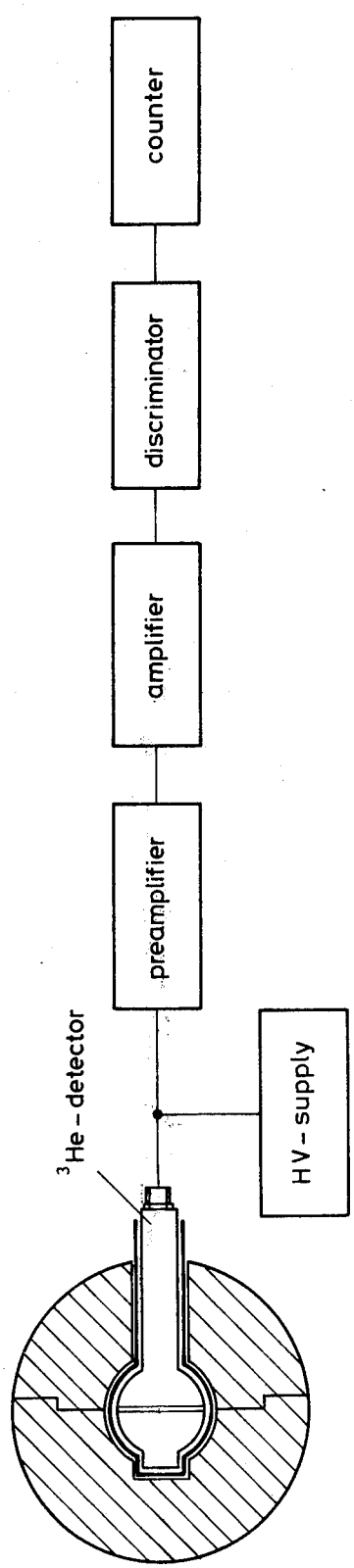

FIG. 4 represents a block diagram showing the detector with mantle and the devices following said detector.

The device according to the invention for determining the dose equivalent or the dose rate equivalent of neutrons is characterized primarily in that a voltage discriminator is employed with which the bias level is located above the height of the voltage of the by far greatest number of the voltage pulses distributed around the maximum. Voltage pulses which have a lower height than the threshold value will in this way not pass to the device for counting or for measuring the time average number of the voltage pulses emitted by the discriminator.

It is known with devices for determining the dose equivalent or the dose rate equivalent, to suppress voltage pulses by a voltage discriminator interposed between the detector and the device for counting the voltage pulses. In this instance, however, only voltage pulses of low height are involved which are initiated, for instance, by gamma radiation and would for measuring neutrons represent an interfering or disturbing background. In contrast thereto, according to the present invention also such voltage pulses are retained by the bias level in the discriminator which are initiated by neutrons of predominantly low energy.

A very advantageous design of the device according to the invention consists in that as a detector there is employed a counting tube filled with the isotope $^3$He for the indication of neutrons. Thermal neutrons will in the ³He counting tube generate a nuclear reaction which free an energy of 770 keV. In case that a ³He counting tube is employed as a detector, it is advantageous when the height of the voltage threshold of the voltage discriminator corresponds to an energy in the energy range of between 800 and 850 keV.

It is also advantageous to make the mantle of the detector of polyethylene which surrounds the cadmium layer and has a wall thickness of from 3 to 5.5 centimeters while the wall thickness is selected at a desired precision of the adaptation of the device to the dose equivalent curve and in conformity with the threshold value set in the discriminator.

A further modification of the device according to the invention is advantageously usable as a personal albedo dosimeter. This modification consists in that the mantle of the detector comprises a cadmium layer with a thickness of from about 0.1 to 2 millimeters while that part of the mantle which serves as moderator is replaced at least partially by that portion of the person which is closest to the detector.

If for that part of the mantle which serves as moderator there is provided a polyethylene wall, this wall may in the direction of the body of the person carrying the personal dosimeter, be eliminated because that portion of the person to which the dosimeter is fastened takes over the function of the moderator. At that side which faces away from the body of the person it will suffice, depending on the desired adaptation of the dosimeter to the dose equivalent curve, to give the wall a less thickness. Depending on the desired precision of the dosimeter, the polyethylene wall may also be dispensed with entirely. The non-sensitivity of the device employed as albedo dosimeter for neutrons with energies below 0.5 eV is immaterial because the neutrons of this energy can be indicated by means of the cadmium absorber of known film badges.

In case that the device employed as albedo-personal dosimeter according to the invention is to be sensitive also for neutrons with energies below 0.5 eV, that portion of the mantle which faces the detector expediently consists of a perforated cadmium layer. Inasmuch as the wall of the moderator of the device has not the same thickness toward all sides, the bores in the cadmium layer should be distributed differently.

Referring now to the drawings in detail and FIG. 1 thereof in particular, FIG. 1 illustrates a detector 1 with a mantle which comprises an absorbing layer 2 engaging the detector 1, and an outer mantle 3 of a hydrogen containing material.

For determining the sensitivity curves illustrated in FIGS. 2 and 3, as detector there was employed, a ³He counting tube generally known under the designation SP9. The absorbing layer 2 consisted of a cadmium layer with a thickness of 1 millimeter. The detector 1 was connected to a high voltage device, not illustrated in the drawings. Moreover, as likewise not illustrated in the drawings, the detector 1 was followed by a preamplifier which in turn was followed by a main amplifier and a voltage discriminator and a counter connected to the voltage discriminator. The height of the threshold of the voltage discriminator corresponded to an energy of 825 keV.

In the curves illustrated in FIGS. 2 and 3, the sensitivity of the device is plotted over the ordinate, and the energy of the neutrons impacting upon the mantle of the detector 1 are plotted over the abscissa.

The sensitivity is calculated from the formula $$\text{Sensitivity} = \frac{\text{Counting rate}}{\text{Dose rate equivalent}}$$

The crosses in the curve illustrates the results of measurements with neutrons from radioactive-neutron sources and monoenergetic neutrons of 14 MeV. The measurements obtained with the radiioactive-neutron sources are plotted in the curves with an energy which corresponds to the average energy of the neutrons of the radioactive-neutron sources. The dash-line region of the curve was interpolated.

The device, the sensitivity curve of which is illustrated in FIG. 2, comprised a mantle 3 of polyethylene with a wall thickness of 5.08 centimeters. The mantle 3 of polyethylene of the second device, the sensitivity curve of which is illustrated in FIG. 3, had a wall thickness of 3.81 centimeters. As will be evident from FIGS. 2 and 3, the device with the greater wall thickness is better adapted to the dose equivalent curve, but also the device with the thinner wall thickness has a sufficiently precise adaptation to the dose equivalent curve.

FIG. 4 shows the detector 1 with a mantle 3 and also indicates the devices following the detector 1, namely the preamplifier and main amplifier, the voltage discriminator and the counter for counting the time average number of the voltage pulses emitted by said discriminator.

As will be evident from the above, the present invention brings about that in order to obtain a good adaptation of the curve of the counting rate per unit flow density as function of the neutron energy to the dose equivalent curve, it is not necessary to moderate the neutrons in a mantle with great wall thickness. The device according to the invention therefore has a mantle of thinner wall thickness than was possible with heretofore known devices. The mantle according to the invention expediently consists of a hydrogen containing material in which, if desired, a perforated absorbing layer is embedded.

The neutrons of low energy will, due to their very highly effective cross section for the nuclear reaction in the detector initiate a very high number of voltage pulses. The distribution of the height of the voltage of these voltage pulses extends over a greater energy range due to the statistic nature of the processes in the detector during the generation of the voltage pulses while the maximum of the distribution of these voltage pulses brought about by neutrons of low energy, corresponds to the energy freed during the nuclear reaction. In order to suppress the by far greatest number — expediently at least 95% — of these voltage pulses, the threshold value is set for a height which is above the maximum of the distribution at the bottom of the distribution curve. The height of the voltage pulses passing through the discriminator corresponds to the total of the energy freed during the nuclear reaction and to the kinetic energy of the neutrons absorbed in the detector.

Due to the additional feature of the invention that that portion of the mantle of the detector which faces toward the detector comprises a cadmium layer of a thickness of about 0.1 to 2 millimeters. it will be realized that all neutrons with energies below 0.5 eV are absorbed outside the detector and thus do not enter the detector. The number of voltage pulses created by neutrons of low energy is therefore considerably less so that it is possible to set the threshold value of the voltage discriminator to a lower height and thus to realize a still better adaptation of the curve of the counting rate per unit flow density as function of the neutron energy to the dose equivalent curve.

The sensitivity of the device, the mantle of which comprises a cadmium layer facing the detector, is practically zero for neutrons with energies below 0.5. Since, however, generally behind shields of neutron sources, the component of the dose rate equivalent which is created by neutrons with energies below 0.5 eV is less than 5% of the total dose rate equivalent, the adaptation of the device to the dose equivalent curve is immaterially influenced by the above mentioned fact that the sensitivity of the device, the mantle of which has a cadmium layer facing the detector, is practically zero for neutrons with energies below 0.5. If also neutrons with energies below 0.5 eV are to be measured, it is possible to provide a perforated cadmium layer as that part of the mantle which faces the detector, or to connect the device according to the invention with a detector for measuring neutrons with energy below 0.5 eV.

There has been acknowledged as being known and belonging to the state of the art that with devices for determination of dose rate equivalent there can be suppressed low voltage impulses as, for example, impulses released or triggered by gamma radiation by way of a voltage discriminator connected between a detector and a device for counting the voltage impulses. According to the present invention the discriminator primarily serves therefor to withhold voltage impulses, which become released by way of neutrons of predominantly low energy; accordingly a sufficiently accurate matching of the curve of the counting rate per unit flow density becomes achieved as a function of the neutron energy as to the dose-equivalent curve without having to provide a moderator of large wall thickness or strength.

Every expert or average man skilled in the art knows that with a device for determination of dose equivalent with a detector (which for example can be a $^3$He-counting tube, a $BF^3$-counting tube, or a $^6$LiJ-scintillator) surrounded by a moderator for the low energy neutrons generated in the moderator by way of braking so that probability of a reaction in the detector is considerably higher than for the primary neutrons (in the case of the $^3$He-counting tube more than a factor 1,000). The average man skilled in the art previously concluded therefrom that for increase of sensitivity of the device, for instance, of high energy there is necessary to make neutrons of the registration accessible thereby in that the same become braked or slowed by way of the moderator in a sufficient number. In other words, the sensitivity of the device of neutrons for high energy previously was attainable only by way of sufficient wall thickness of the moderator. Since a device for determination of dose rate equivalent determinatively must provide a sufficient sensitivity for neutrons of the entire spectrum, in other words, also higher energies, this meant for the average man skilled in the art that accordingly with the previous knowledge a predetermined moderator thickness basically could not be exceeded.

There is apparent that the average man skilled in the art even with a device which permits measurement of only neutrons in the known energy range 200 keV – 14 MeV could not and did not expect a reduction of the moderator thickness below approximately 7 cm. First by way of the teaching of the present invention did there become possible creation of devices with essentially smaller moderator thickness, which likewise provided high accuracy.

Attention is drawn to the fact that no reference to the electronic features of U.S. Pat. No. 3,452,197-Saylor, et al dated June 24, 1969 is necessary in order to show that the electronic device following the device of the present invention has been known and that a utilization of such electronic means would be known.

There is noted that in lines 15–17, column 3 of the U.S. Pat. No. 3,141,092- Weinberg dated July 14, 1964, reference is made to a suitable electronic means well known with a radiation measuring device, and these means are the above-mentioned well-known device.

The neutron detector disclosed by U.S. Pat. No. 3,141,092-Weinberg does not in any way suggest a construction essentially similar to that of the present invention device. FIG. 2 of the U.S. Pat. No. 3,141,092-Weinberg shows a known neutron detector having two moderator layers between which a cadmium layer is arranged. In comparison with the device of the present invention, there is noted that the mantle surrounding the device of the present invention consists of a single layer of moderator material and one layer of cadmium which faces toward the detector. Two different constructions are involved; basically different measures or features are involved for attaining an indication of the dose equivalent independent of the energy of the neutrons; and accordingly there is made possible attaining of an accurate matching relative to the ICRP (ICRP = International Commission Radiological Protection) curve in the aforementioned neutron energy range.

According to the teaching of Weinberg in essence only thermal neutrons are measured (lines 26–28 of column 4 of Weinberg); under these circumstances the higher energetic neutrons are measured indirectly by way of the number of thermal neutrons registered in the detector (lines 36–41, column 4 of Weinberg). With the device of the present invention no thermal neutrons are registered. Moreover as a consequence of the cadmium layer facing toward the detector, there is stressed that no thermal neutrons come into the detector. Through this feature, in connection with the further features according to the invention, whereby a voltage discriminator is used with which the height of the voltage peak lies above the height of the voltage of by far the largest number of the maximum voltage impulse distributed, there has been created a device which is more handy than the previously known device and additionally provides an accurate adaptation to the ICRP curve. In order to clarify this still further, attention is directed to the statements in the following paragraphs, particularly in case of a 3-helium counting tube is used as a detector.

If a 3-helium counting tube is irradiated with monoenergetic neutrons without being surrounded by a moderator, the maximum of the impulse-level distribution is dependent upon the energy of the neutrons encountered. With increasing neutron energy there occurs an increase in the position of the maximum of impulse level distribution. If the 3-helium counting-tube is additionally surrounded by a moderator as is the case with the conventional neutron detectors, part of the higher energetic neutrons are braked or slowed down. Since for the slowed-down neutrons the probability of a reaction with the 3-helium is higher by a multiple than for the primary neutron, the slowed down neutrons of low energy in the 3-helium counting tube generate an impulse distribution with a maximum at 770 keV which corresponds to the reaction energy corresponds of the nuclear reaction 3-He (n,p) 3H (the effective cross section for the n,p reaction of 3-He drops in value from 1300 barn for 0.5 eV neutron energy to 0.7 barn for 1 MeV neutron energy).

There is a generally known phenomenon encountered with detection of ionizing radiation, namely that particles of equal energy generate a line of finite width (normal distribution). This phenomenon is a consequence of the statistic fluctuations unavoidable during the pulse generation. As a result thereof, the relatively few pulses of neutrons of higher energy are partially covered by the impulse maximum due to the impulse distribution which comes from neutrons of low energy. With the known devices where the detector is directly surrounded by the moderator and therefore a relatively high number of thermal neutrons pass into the counting tube as is the case also with the counting tube of Weinberg, there was accordingly no discriminator threshold so adjustable in practice that an accurate matching relative to the ICRP curve was possible, and accordingly that there was not possible an indication of neutrons independent of energy. Therefore it is also not true that the energy level of the pulses which are passed through the voltage discriminator can be considered to be a mere matter of choice. If this were the case, the average man skilled in the art would long ago have created a device with the dimensions of the device according to the present invention. It is the merit of the present invention to have recognized the aforementioned interrelationships.

There is not believed well founded that the thickness of the moderator layer exists with the device of the present invention in the range of the dimensions set forth by Weinberg and the following statements are made in support of this belief. The mantle surrounding the device according to the present invention may be compared only with that part of the mantle disclosed by the Weinberg device which faces toward the voltage source. The thickness of this part of the mantle, however, amounts to 1.58 inches + 1.18 inches = 2.76 inches $\doteq$ 7 cm. This smaller lateral moderator thickness with the device of Weinberg represents nothing more than the fact that there is involved a device having an indication strongly dependent upon direction. Such a device, however, cannot be reasonably compared with the device of the present invention.

It is, of course, to be understood that the present invention is, by no means, limited to the specific showing in the drawings, but also comprises any modifications within the scope of the appended claims.

What we claim is:

1. An apparatus for obtaining an indication of the dose equivalent independent of the energy of the neutrons and dose rate equivalent of neutrons without registering any thermal neutrons, which includes in combination: a detector operable to absorb neutrons and to emit voltage pulses, a mantle surrounding said detector having only a single moderator layer for moderating purposes and for absorbing neutrons, amplifying means following and in series with said detector for amplifying the voltage pulses emitted by said detector, a voltage discriminator arranged to receive the amplified voltage pulses, recording means following and arranged in series with said voltage discriminator for registering the time average number of the voltage pulses emitted by said voltage discriminator withholding voltage impulses while said detector for neutrons with energies up to at least $10^6$ eV emits voltage pulses the height of which depends both on the energy freed by the nuclear processes initiated by the absorbed neutrons and on the kinetic energy of the absorbed neutrons, and while the number of the voltage pulses with a height located within the range of the energies freed in the nuclear processes is at a maximum, said voltage discriminator having the height of the voltage threshold located above the height of the voltage of the by far greatest number of the voltage pulses distributed about said maximum, that part of said mantle which faces said detector comprising a cadmium layer having a thickness of from 0.1 to 2 millimeters to preclude thermal neutrons.

2. An apparatus in combination according to claim 1, in which said detector is designed as a counting tube filled with the isotope $^3$He for indicating neutrons.

3. An apparatus in combination according to claim 2, in which the bias level of said voltage discriminator corresponds to an energy in an energy range of from 800 to 850 keV.

4. An apparatus in combination according to claim 1, in which the mantle surrounding said detector comprises a mantle of polyethylene, which last mentioned mantle surrounds said cadmium layer and has a wall thickness of from about 3 to 5.5 centimeters.

5. An apparatus in combination according to claim 1, in which the mantle surrounding said detector comprises a cadmium layer having a thickness of from about 0.1 to 2 millimeters, and in which that part of said mantle which serves as moderator is to be formed at least partially by that part of the wearer of said apparatus which when the apparatus is connected to the wearer is closest to said detector.

* * * * *